United States Patent [19]
Stahlke et al.

[11] Patent Number: 5,126,380
[45] Date of Patent: Jun. 30, 1992

[54] USE OF POLYARYLENE SULPHIDES FOR THE PRODUCTION OF A STRUCTURAL FOAM RESISTANT TO HIGH TEMPERATURES, PROCESS FOR THE PREPARATION OF THIS FOAM, AND MOULDINGS OBTAINABLE BY THIS PROCESS

[76] Inventors: Kurt-Rainer Stahlke, c/o Bayer Aktiengesellschaft, D 5090 Leverkusen, Bayerwerk, Fed. Rep. of Germany; William C. Bushong, c/o Mobay Corporation, Plastics/Bldg. 8, Pittsburgh, Pa. 15205

[21] Appl. No.: 783,504

[22] Filed: Oct. 28, 1991

Related U.S. Application Data

[62] Division of Ser. No. 543,555, Jun. 26, 1990.

[30] Foreign Application Priority Data

Jul. 5, 1989 [DE] Fed. Rep. of Germany ....... 3922038

[51] Int. Cl.⁵ ............................................. C08J 9/10
[52] U.S. Cl. ................................... 521/138; 521/134; 521/180; 521/189

[58] Field of Search ............... 521/180, 189, 138, 134, 521/95

[56] References Cited

U.S. PATENT DOCUMENTS 3,925,270 12/1975 Hunter ................................. 521/95
4,183,822 1/1980 Collington et al. ................ 521/143
4,263,409 4/1981 Liberti .
4,607,059 8/1986 Kmiec et al. ....................... 521/143
4,804,689 2/1989 Mayska et al. ..................... 521/180

FOREIGN PATENT DOCUMENTS 2379370 10/1978 France .
2379910 10/1978 France .
1594892 8/1981 United Kingdom .
1600427 10/1981 United Kingdom .

Primary Examiner—Morton Foelak

[57] ABSTRACT

The invention relates to the use of polyarylene sulphides (PAS), preferably polyphenylene sulphide (PPS) for the preparation of a structural foam, a process for the production of this foam, and mouldings obtainable by this process.

3 Claims, 1 Drawing Sheet

2mm

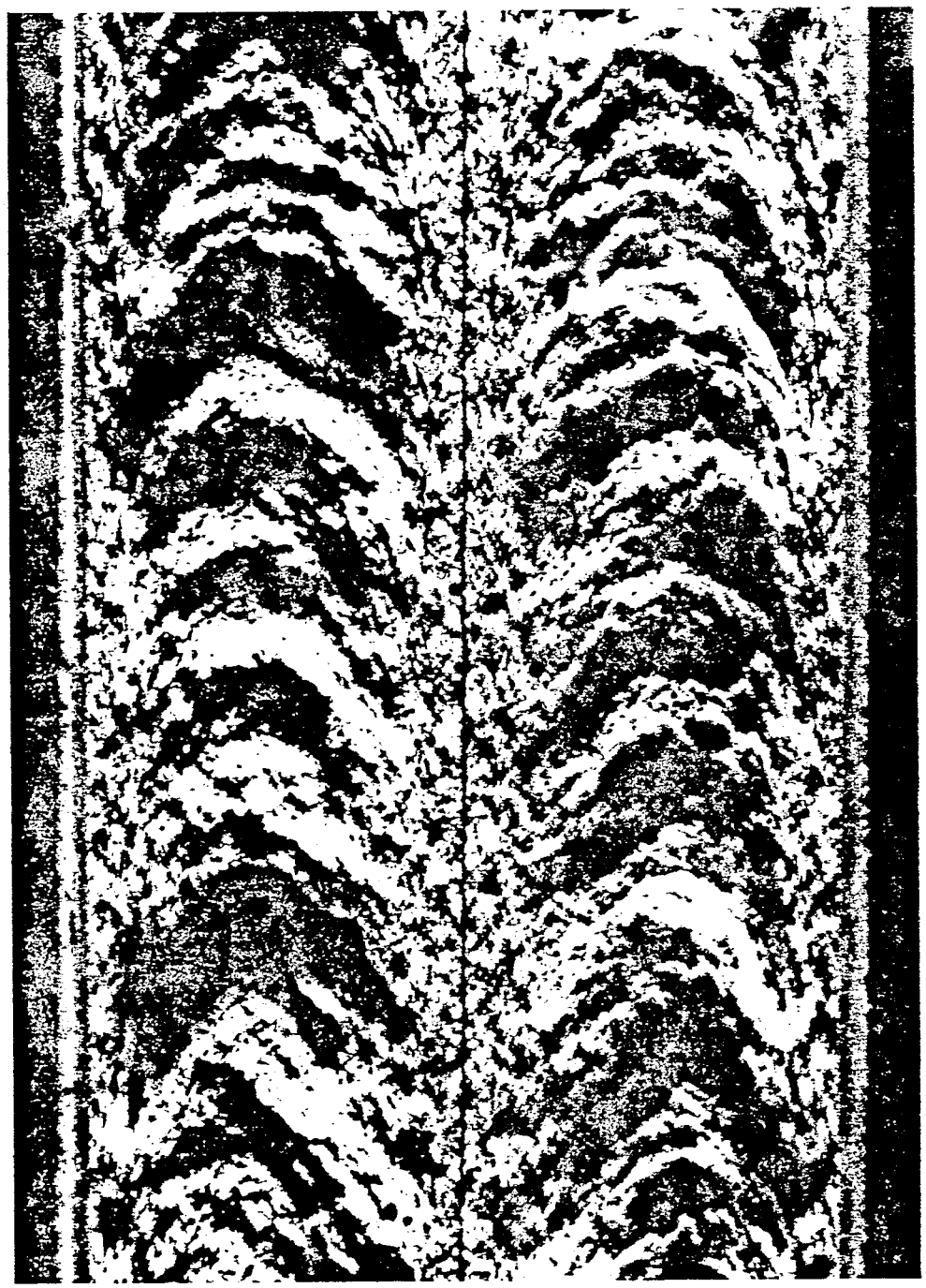
Fig.1.  2mm

USE OF POLYARYLENE SULPHIDES FOR THE PRODUCTION OF A STRUCTURAL FOAM RESISTANT TO HIGH TEMPERATURES, PROCESS FOR THE PREPARATION OF THIS FOAM, AND MOULDINGS OBTAINABLE BY THIS PROCESS

This is a division of application Ser. No. 543,555 filed Jun. 26, 1990.

The invention relates to the use of polyarylene sulphides (PAS), preferably polyphenylene sulphide (PPS), for the production of a structural foam, a process for the production of this foam, and mouldings obtainable by this process.

It is known that thermoplastic injection moulding materials can be processed to mouldings or extrudates by the use of chemical or physical blowing agents with expansion in the mould using the structural foam injection moulding process.

However, mouldings produced in the low pressure structural foam process (LPSF process) show only a small density reduction of 2-3% by weight (Plastic Design Forum Jul./Aug. 1988). Another possibility for obtaining parts produced by the structural foam injection moulding process is described in EP-A 25 108. However, this process involves considerable chemical modifications (sulfphone carbonates, catalysts, heating).

Usually, however, mouldings or extrudates produced by the structural injection moulding process are produced by metering in a blowing agent masterbatch (see: Makrolon Polycarbonate Structural Foam brochure, Mobay Chemical Corp. 1985). However, the use of blowing agent masterbatches is often restricted since they must not expand during the preparation of masterbatches. On the other hand, a chemical blowing agent must undergo controlled decomposition in the structural injection moulding process so that a moulding is formed having a cell structure as uniform as possible. It is thus ensured that there cannot be any mechanically weak points with nonuniform foam structure.

The use of chemical blowing agents for the production of foamed thermoplastics resistant to high temperatures has been unsuccessful to-date for the above-mentioned reasons.

It has now been found, surprisingly, that thermoplastic moulding materials resistant to high temperatures can be prepared in a simple process.

The invention relates to the use of polyarylene sulphides (PAS), preferably polyphenylene sulphides (PPS), optionally as a mixture with fillers, for the production of structural foam.

Polyarylene sulphides which can be used according to the invention are known (for example U.S. Pat. No. 3,354,129 and EP-A 171 021) and are commercially available (for example TEDUR ®).

For the production of the foam, the polyarylene sulphides can be mixed from 0 to 80% by weight, preferably from 40-60% by weight (based on polyarylene sulphide) of fillers. The fillers used may be organic and/or inorganic fillers, for example glass fibers, glass spheres, silicates, such as mica or talc, carbonates, such as magnesium carbonate, sulphates, such as $BaSO_4$ or $CaSO_4$, oxides such as $TiO_2$, carbon fibers, aramide fibers, carbon, metals, metal fibers, etc.

The invention also relates to a process for the production of a structural foam, characterised in that 0.1 to 5% by weight of a blowing agent masterbatch is added to the polyarylene sulphides, and the mixture is homogeneous and is expanded at 300° to 360° C., and mouldings obtainable by this process.

In the production of the foam, a blowing agent masterbatch is used. This contains 0.2-10% by weight of a chemical blowing agent, preferably 3-5% by weight. The base resin used for this masterbatch is a partially crystalline or amorphous thermoplastic resin resistant to high temperatures, preferably a polycarbonate, such as Makrolon ®, having a relative viscosity (in $CH_2Cl_2$, 25° C./0.5 g per 100 ml) of 1.260-1.285.

This blowing agent masterbatch is added to the polyarylene sulphide as the dry mixture in amounts of 0.2-5% by weight (based on PAS), preferably 0.8-1.5% by weight. Mixing is then carried out for 10-40 minutes, preferably 15-25 minutes, on a drum tumbler or other suitable mixing device.

The chemical blowing agents used for expansion are customary substances, for example azo compounds, such as azodicarboxamide, anhydrides, such as itaconic anhydride, azoles, such as 5-phenyltetrazole, etc. Customary "kickers", for example zinc oxide, can be used to accelerate the decomposition.

The polyarylene sulphide foam is produced at processing temperatures of 300°-360° C., which are usual for polyarylene sulphide (injection moulding or extrusion process), in the air under atmospheric pressure. If necessary, the procedure can be carried out in the absence of $O_2$, under an inert bas, (for example $N_2$).

Mouldings produced in the structural foam moulding process from the above-mentioned mixtures have a uniform cell structure (see FIG. 1), the typical layer of a structural foam with uniform cell structure being observed. A density reduction of 35-50% by weight, preferably 40-45% by weight, is obtained in the moulding.

Mouldings produced according to the invention have the properties known for polyarylene sulphides, such as high heat resistance, rigidity, resistance to chemicals and low flammability.

These structural foams are used where, in addition to the properties familiar for polyarylene sulphides, weight reduction, thermal insulation and good flame-retardant properties are also important. Due to the good flowability of this resin, large sink-free parts can be produced.

Applications for mouldings produced according to the invention are, in the aviation and motor vehicle market, in the field of large partitions for thermal insulation and in the construction of chemical plants and apparatuses.

It is also possible to extrudates this material, in shapes, such as, pipes, sheets and other hollow articles. All mouldings and extrudates can be coated, metallised or adhesively bonded using known technologies or can be moulded by inserting metal parts or foils in an injection mould.

EXAMPLES

Example 1

1% by weight of a masterbatch of a commercial polycarbonate having a relative viscosity of 1280 and 4% by weight of 5-phenyltetrazole are added to 10 kg of a polyphenylene sulphide prepared according to EP-A 171 021 and provided with 40% by weight of a commercial glass fiber, and mixing is carried out for 20 minutes on a drum tumbler. Processing is then carried out on a standard injection moulding machine under the conditions customary for the structural foam injection moulding process.

A structural foam having a uniform pore structure, a pore size of about 0.05 to 0.5 mm (see FIG. 1) and a specific gravity of 0.90 g/cm$^3$ is obtained. A base resin which has a specific gravity of 1.65 g/cm$^3$, corresponds to a density reduction of 45.5% by weight.

The mouldings obtained have a flexural strength of 120 N/mm$^2$, an outer fiber elongation of 1.9%, a flexural modulus of elasticity of 9000 N/mm$^2$ and an impact strength of 10 kg/cm$^2$.

The heat distortion temperature HDT-A (1.81 N/mm$^2$) is 200° C. The UL 94 (8 mm) classification gives VO (by our measurements).

Example 2

A resin described in Example 1 is mixed with 3% by weight of a blowing agent masterbatch described in Example 1 on a drum tumbler for 20 minutes. Injection moulded finished parts showed a weight reduction of 50% by weight (density =0.84 g/cm$^3$).

We claim:

1. Polyarylene sulfide foam having a substantially uniform cell structure prepared by homogeneously blending polyarylene sulfide with 0.1 to 5% by weight of a blowing agent masterbatch and then foaming the homogeneous mixture by heating the mixture to 300° to 360° C., wherein said blowing agent masterbatch contains 0.2 to 10% by weight of a chemical blowing agent in an amorphous or partially crystalline polycarbonate resin resistant to high temperatures and having a relative viscosity of 1.260–1.285 measured in CH$_2$Cl$_2$ at 25° C. at 0.5 gram per 100 ml, and wherein said blending is as a dry mixture for 10 to 40 minutes in a drum tumbler.

2. Polyarylene sulfide foam according to claim 1 wherein the amount of blowing agent masterbatch is 0.8 to 1.5% and the amount of chemical blowing agent in the masterbatch is 3 to 5% by weight.

3. Polyarylene sulfide foam according to claim 1 wherein foaming results in a density reduction of 35 to 50%.

* * * * *